United States Patent
Zunke et al.

(10) Patent No.: US 9,962,836 B2
(45) Date of Patent: May 8, 2018

(54) DETECTION DEVICE AND DETECTION METHOD

(71) Applicant: KUKA SYSTEMS GMBH, Augsburg (DE)

(72) Inventors: Richard Zunke, Augsburg (DE); Andreas Domke, Stuttgart (DE); Konrad Wirth, Tiefenbronn (DE); Thomas Rau, Diedorf (DE); Julian Stockschläder, Ulm (DE)

(73) Assignee: KUKA SYSTEMS GMBH, Augsburg (DE)

( * ) Notice: Subject to any disclaimer, the term of this patent is extended or adjusted under 35 U.S.C. 154(b) by 0 days. days.

(21) Appl. No.: 15/034,991

(22) PCT Filed: Nov. 6, 2014

(86) PCT No.: PCT/EP2014/073871
§ 371 (c)(1),
(2) Date: May 6, 2016

(87) PCT Pub. No.: WO2015/067680
PCT Pub. Date: May 14, 2015

(65) Prior Publication Data
US 2016/0279797 A1    Sep. 29, 2016

(30) Foreign Application Priority Data
Nov. 8, 2013    (DE) .................... 20 2013 105 036 U

(51) Int. Cl.
G05B 19/04    (2006.01)
B25J 9/16    (2006.01)
(Continued)

(52) U.S. Cl.
CPC ........... B25J 9/1692 (2013.01); B25J 13/085 (2013.01); B25J 19/0095 (2013.01); G01L 5/008 (2013.01);
(Continued)

(58) Field of Classification Search
CPC ...... B25J 9/1676; B25J 9/1674; B25J 9/1692; B25J 13/085; F16P 3/12; G05B 19/423;
(Continued)

(56) References Cited

U.S. PATENT DOCUMENTS

| | | | |
|---|---|---|---|
| 5,880,956 A * | 3/1999 | Graf | B25J 9/1671 |
| | | | 318/568.11 |
| 6,539,771 B1 * | 4/2003 | Davidson | G01G 19/4142 |
| | | | 73/1.13 |

(Continued)

FOREIGN PATENT DOCUMENTS

| | | |
|---|---|---|
| DE | 101 62 412 A1 | 7/2003 |
| DE | 10 2006 055 849 A1 | 5/2008 |

(Continued)

OTHER PUBLICATIONS

Huelke et al. "How to approve Collaborating Robots—The IFA force pressure measurement system". Proceedings of the 7th International Conference on the Safety of Industrial Automated Systems. Oct. 11-12, 2012. pp. 204-209. <http://www.irsst.qc.ca/media/documents/PublRSST/SIAS-2012.pdf>.*

(Continued)

*Primary Examiner* — Jonathan Dunlap
(74) *Attorney, Agent, or Firm* — McGlew and Tuttle, P.C.

(57) ABSTRACT

A detection device and a detection method are provided for robot-induced loads that can act upon the human body in contact with the robot during a working process. The robot-induced loads, in particular forces, are measured by the measuring device (16) of an external sensing device (2). The (Continued)

measuring device (16) is suitably positioned and oriented in this process in the working area of an industrial robot (3) by means of a positioning device (15).

17 Claims, 7 Drawing Sheets

(51) Int. Cl.
*B25J 19/00* (2006.01)
*G01L 5/00* (2006.01)
*B25J 13/08* (2006.01)
*G05B 19/423* (2006.01)
*F16P 3/12* (2006.01)

(52) U.S. Cl.
CPC ............ *B25J 9/1674* (2013.01); *B25J 9/1676* (2013.01); *F16P 3/12* (2013.01); *G05B 19/423* (2013.01); *G05B 2219/37205* (2013.01); *G05B 2219/39013* (2013.01); *G05B 2219/39031* (2013.01); *G05B 2219/39319* (2013.01); *G05B 2219/40226* (2013.01); *G05B 2219/42288* (2013.01); *G05B 2219/49162* (2013.01)

(58) Field of Classification Search
CPC ........... G05B 2219/37205; G05B 2219/39013; G05B 2219/39031; G05B 2219/39319; G05B 2219/40226; G05B 2219/42288; G05B 2219/49162
USPC ....... 700/245, 255, 254, 258, 253, 260, 301; 73/1.15, 862.541, 862.381
See application file for complete search history.

(56) References Cited

U.S. PATENT DOCUMENTS

| | | | | |
|---|---|---|---|---|
| 7,031,807 B2* | 4/2006 | Heiligensetzer | ....... | B25J 13/084 700/245 |
| 7,086,293 B2* | 8/2006 | Heiligensetzer | ....... | B25J 9/1674 73/795 |
| 8,315,735 B2* | 11/2012 | Nihei | ..................... | B25J 9/1676 318/568.11 |
| 8,423,189 B2* | 4/2013 | Nakanishi | .............. | B25J 9/1676 700/255 |
| 8,594,847 B2* | 11/2013 | Schreiber | ............... | B25J 13/085 700/258 |
| 8,868,236 B2* | 10/2014 | Brogardh | ............... | B25J 9/162 700/254 |
| 8,909,373 B2* | 12/2014 | Bjorn | ..................... | B25J 9/1676 700/245 |
| 9,126,336 B2* | 9/2015 | Eakins | .................. | B25J 9/1687 |
| 9,579,798 B2* | 2/2017 | Wang | ..................... | B25J 9/1676 |
| 2002/0066302 A1* | 6/2002 | Hamm | ............... | G01G 19/4142 73/1.13 |
| 2003/0137219 A1* | 7/2003 | Heiligensetzer | ....... | B25J 13/084 310/328 |
| 2003/0233171 A1* | 12/2003 | Heiligensetzer | ....... | B25J 9/1633 700/260 |
| 2004/0260481 A1* | 12/2004 | Heiligensetzer | ....... | B25J 9/1674 702/33 |
| 2006/0081166 A1* | 4/2006 | Montgomery | .......... | B63B 21/00 114/230.1 |
| 2009/0069936 A1* | 3/2009 | Kock | .................. | B23K 11/318 700/254 |
| 2010/0145515 A1* | 6/2010 | Nakanishi | .............. | B25J 9/1676 700/255 |
| 2010/0234996 A1* | 9/2010 | Schreiber | ............... | B25J 13/085 700/258 |
| 2012/0123590 A1* | 5/2012 | Halsmer | ................. | B25J 9/1656 700/264 |
| 2012/0245733 A1* | 9/2012 | Bjorn | ..................... | B25J 9/1676 700/253 |
| 2013/0123983 A1* | 5/2013 | Brogårdh | ................. | B25J 9/162 700/254 |
| 2014/0052295 A1* | 2/2014 | Eakins | .................. | B25J 9/1687 700/258 |

FOREIGN PATENT DOCUMENTS

| | | |
|---|---|---|
| DE | 10 2007 014 023 A1 | 9/2008 |
| DE | 10 2007 028 758 B4 | 4/2009 |
| DE | 10 2007 063 099 A1 | 7/2009 |
| DE | 10 2008 041 602 A1 | 3/2010 |
| DE | 10 2009 047 033 A1 | 5/2011 |
| DE | 10 2010 052 418 A1 | 6/2011 |
| DE | 10 2011 109 908 A1 | 2/2012 |
| DE | 10 2012 015 975 A1 | 3/2013 |
| DE | 20 2012 101121 U1 | 7/2013 |
| JP | H01 147336 A | 6/1989 |
| JP | 2010-214514 A | 9/2010 |
| WO | 2009/020600 A1 | 2/2009 |

OTHER PUBLICATIONS

Michael Huelke et al: "Sicherheitsnachweis für Kollaborierende Roboter", Tagung Zur Funktionalen Sicherheit, Inerfurt, Mar. 13, 2013 (Mar. 13, 2013), pp. 1-29, XP055206265, p. 7, page 21, pp. 11,14, p. 23-p. 25.

Hans Jürgen Ottersbach et al: "Kollaborierende Roboter—Konzept und Realisierung eines biofidelen Messgerats zur Begrenzung der Kollisionsbelastung auf Personen bei Arbeitsplatzen mit kollaborierenden Robotern", Technische Sicherheit—Bd. 2, Nr. 10, Oct. 1, 2012 (Oct. 1, 2012), pp. 14-19, XP055206259, Retrieved from the Internet: URL:http://www.dguv.de/medien/ifa/de/pub/grl/pdf/2012 125.pdf [retrieved on Aug. 4, 2015] the whole document.

\* cited by examiner

Fig. 4
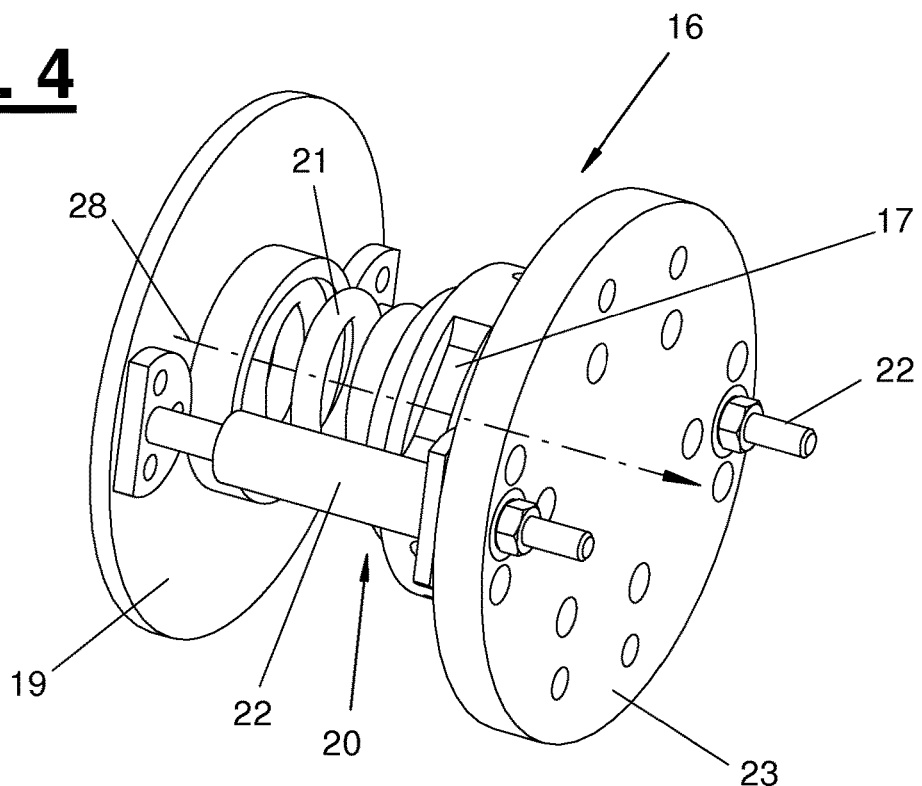
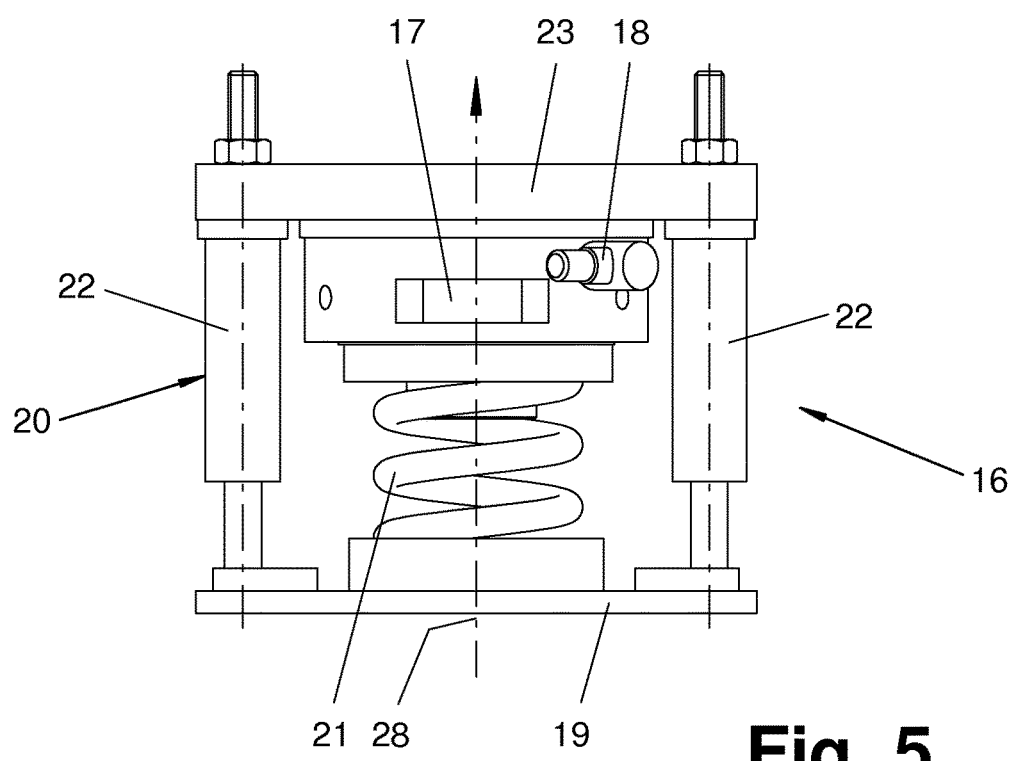
Fig. 5

DETECTION DEVICE AND DETECTION METHOD

CROSS REFERENCE TO RELATED APPLICATIONS

This application is a U.S. National Phase Application of International Application PCT/EP2014/073871 filed Nov. 6, 2014 and claims the benefit of priority under 35 U.S.C. § 119 of German Application 20 2013 105 036.9 filed Nov. 8, 2013, the entire contents of which are incorporated herein by reference.

FIELD OF THE INVENTION

The present invention pertains to a detection device and to a detection method for robot-induced loads, which may act on the human body in a working process in case of physical contact.

BACKGROUND OF THE INVENTION

Humans can cooperate or collaborate with industrial robots, especially tactile robots, in modern working devices. This is called human-robot cooperation or collaboration (HRC). Physical contacts between the human body and the industrial robot or the process tool thereof are permitted in this connection within limits with the use of protective measures based on touch. Tactile articulated arm industrial robots suitable for this are known from, e.g., DE 10 2007 063 099 A1, DE 10 2007 014 023 A1 and DE 10 2007 028 758 B4.

Certain limit values, which differ concerning the type of stress and also depending on the affected region of the human body, especially of a worker, are to be complied with in case of an HRC and the use of touch-based protective measures.

SUMMARY OF THE INVENTION

An object of the present invention is to improve the protection technique for HRC.

The present invention provides a detection technique, a detection device and a detection method that make possible a realistic, measurement-based detection of the robot-induced loads possibly acting on the human body in a working process. These are the mechanical loads, especially forces, which are exerted by the industrial robot or the process tool thereof in the real process on the human body in case of a collision or act there. Collision- and injury-relevant peculiarities of the industrial robot or of the process tool thereof, e.g., sharp-edged or pointed shapes of the colliding robot or tool area, can be taken into account in connection with the detection.

The detection technique being claimed permits optimization of the protective measures when configuring an HRC working device and especially an HRC-suitable industrial robot. The configuration can be based on loads exerted on the body corresponding to the detected and actual process conditions in case of a contact. It is thus more accurate than a configuration based on assumptions.

On the other hand, this configuration can be optimized concerning the performance capacity of the working device and of the industrial robot, especially concerning the speed (s) of the robot. The detection technique may also be used to calibrate a sensor system associated with or integrated in an HRC-suitable industrial robot. Further, validation and proof of the HRC suitability of the working device and of the industrial robot are possible.

Physical contact with the human body can be distinguished according to two types of load, namely, according to the impact force occurring and the clamping and squeezing force occurring. The impact force is a dynamic force, which is transmitted in the first momentum during contact with the human body (peak). The clamping and squeezing force is the static force that remains after a first force momentum. The force limit values for the respective types of stress are specified for individual body regions in a body model. It can be ensured with the detection technique being claimed that these specific force limit values are complied with in the development of HRC working devices and HRC-suitable industrial robots.

The detection technique being claimed has the advantage that the measuring device makes possible a realistic measurement of collision forces during a collision between a human and the robot. The measuring device can be positioned and oriented correctly for the process and practice by means of the positioning device. As a result, it can simulate the body region of a worker that is affected and is to be checked. This is a true process-based simulation.

The detection technique can, furthermore, be adapted to the response of the body part to be secured in case of collision. This applies especially to the springy behavior and possibly also to the damping behavior of the body part in case of collision. An especially realistic detection of the loads occurring in case of a collision, especially of the collision forces, can be achieved hereby. In addition, the measurement of the impact forces as well as of the clamping and squeezing forces can be performed in the course of the actual program of the working device and of the industrial robot.

An industrial robot suitable for human-robot cooperation (HRC for short) is preferably used in the working device being claimed. This preferably has one or more flexible robot axes. The robot axis (robot axes) may have a flexibility regulation. This may have different configurations and generate a different flexibility characteristic. This may be, e.g., an intrinsic flexibility, which is active or passive. The flexibility may also be a simple spring function. The HRC suitability of the industrial robot may be achieved, as an alternative, in a different way, e.g., by an external sensor system or working space monitoring.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a perspective view showing a measuring device of the detection device from FIGS. 1 through 3;

FIG. 5 is a side view showing a measuring device of the detection device from FIGS. 1 through 3;

DESCRIPTION OF THE PREFERRED EMBODIMENTS

Figure 1:
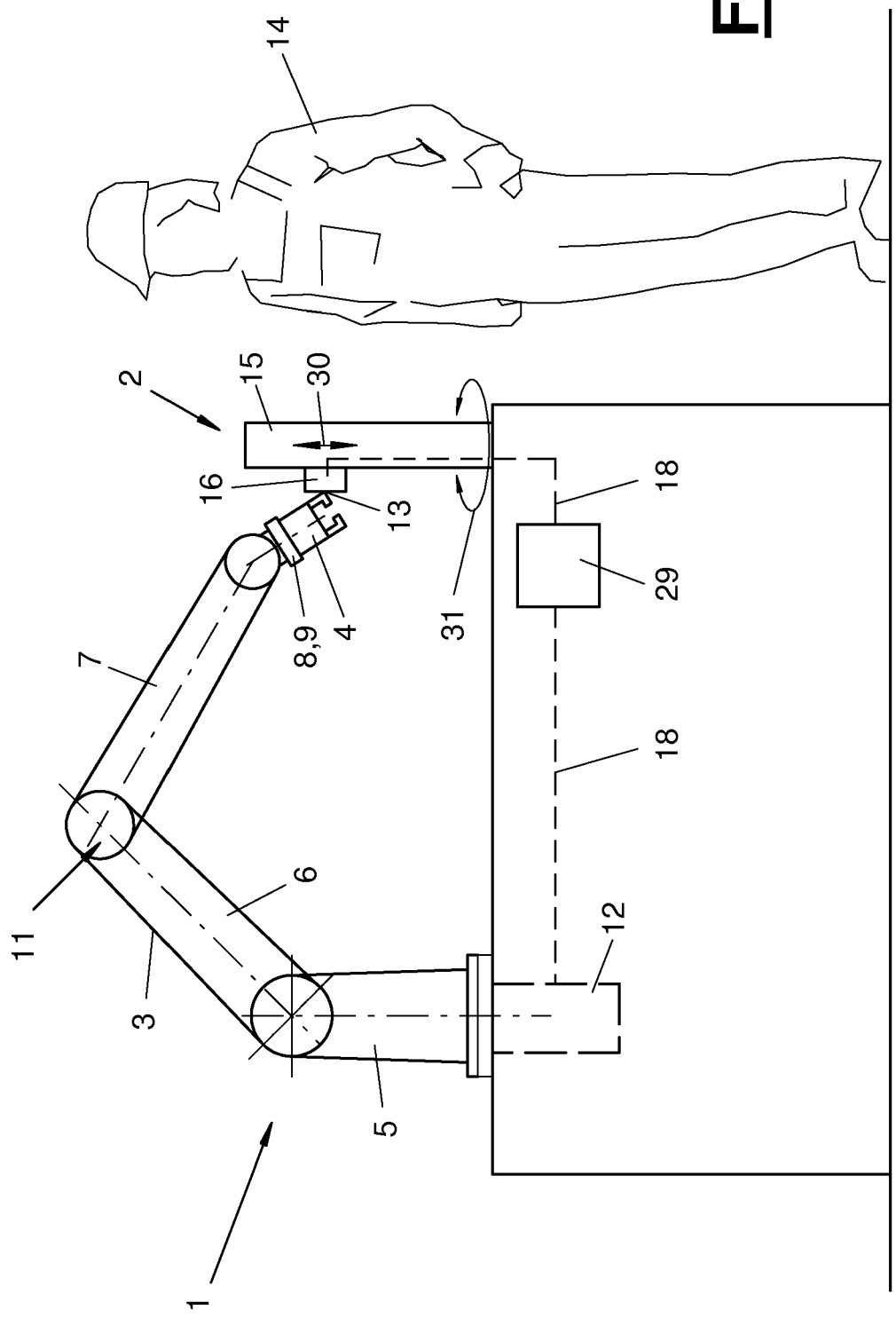
FIG. 1 is a schematic side view showing a workstation with an HRC-suitable industrial robot, with a worker and with a detection device for collision loads.
Figure 2:
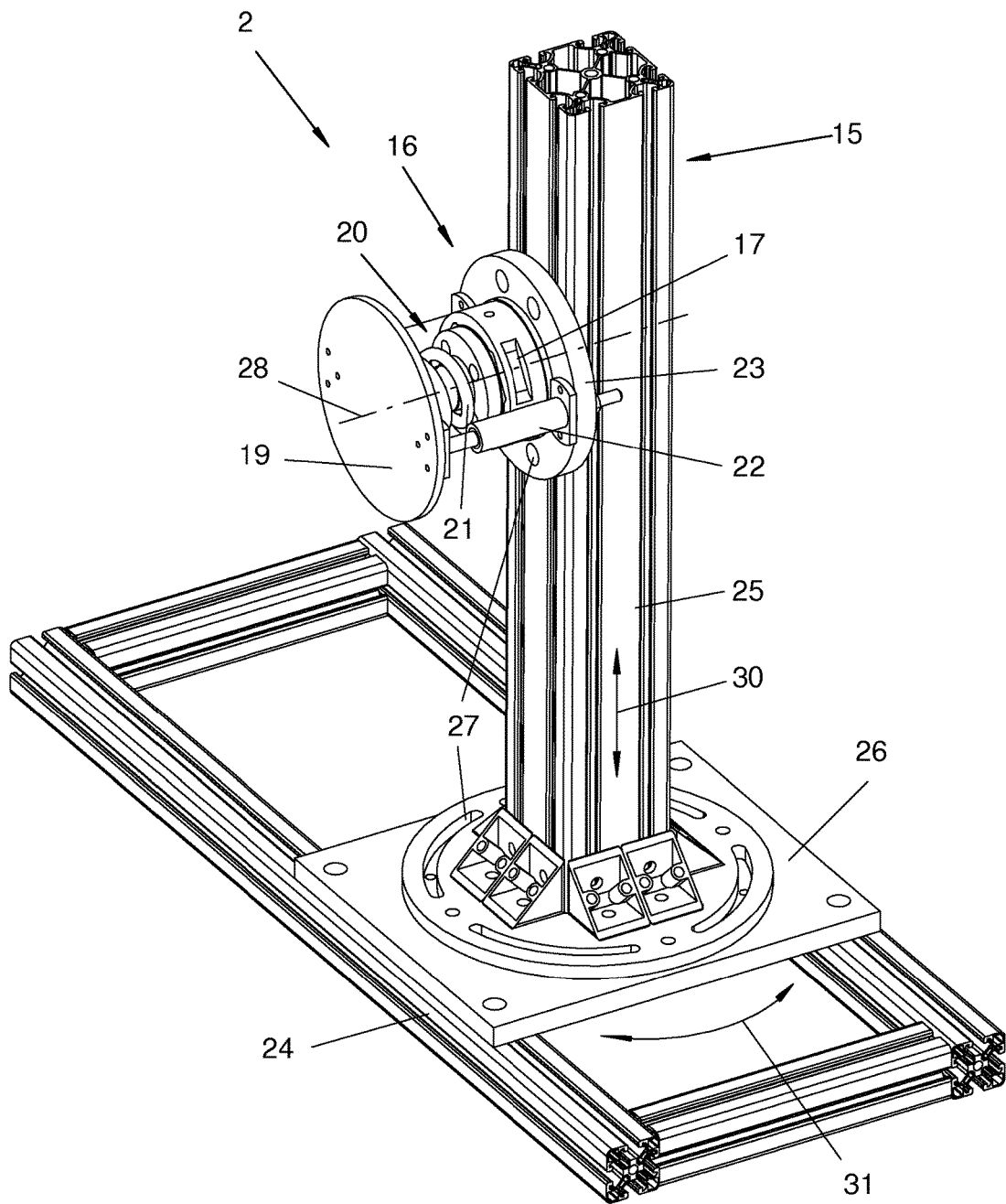
FIG. 2 is a perspective view of the detection device from FIG. 1.
Figure 3:
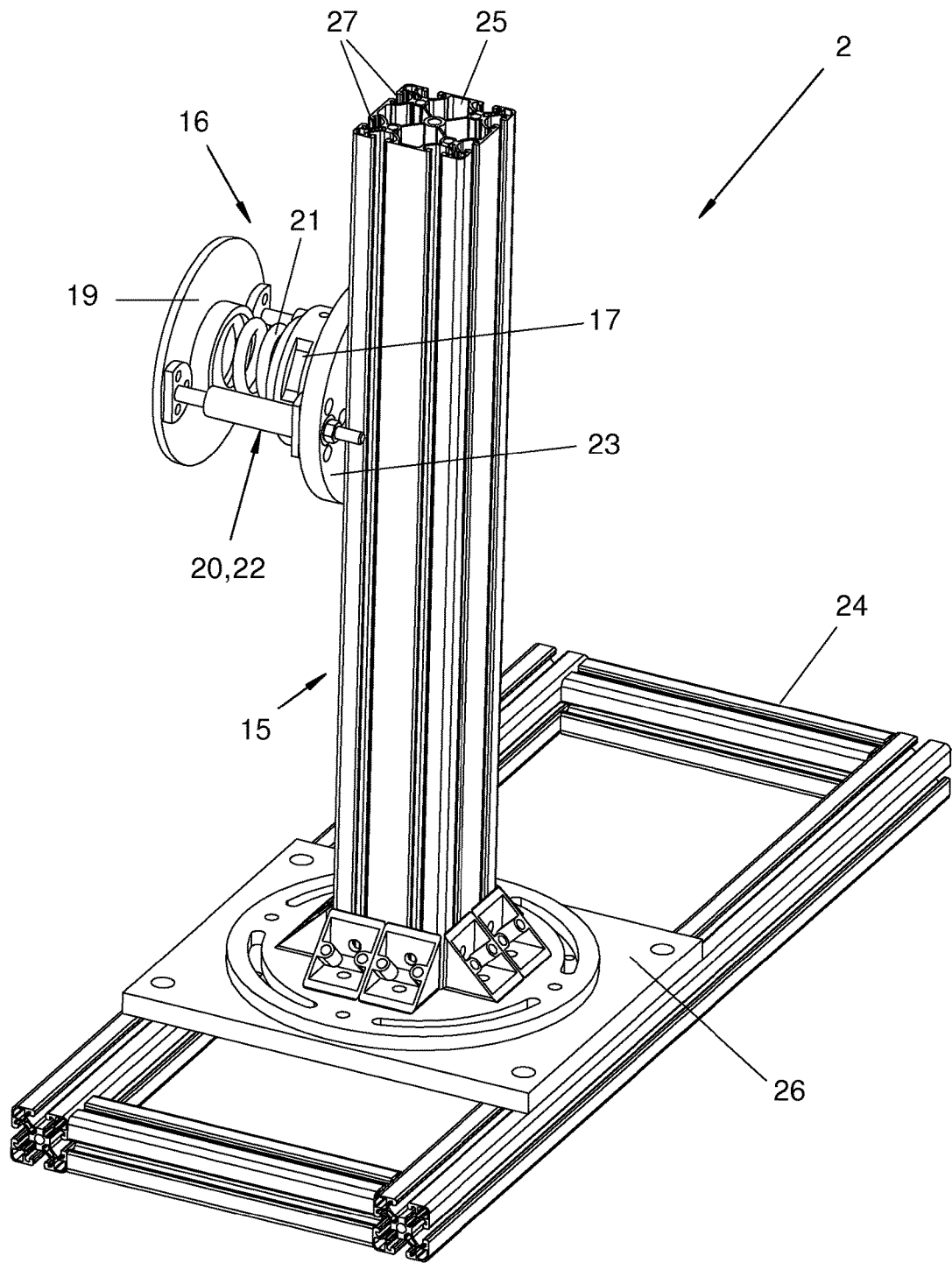
FIG. 3 is another and different perspective view of the detection device from FIG. 1.
Figure 6:
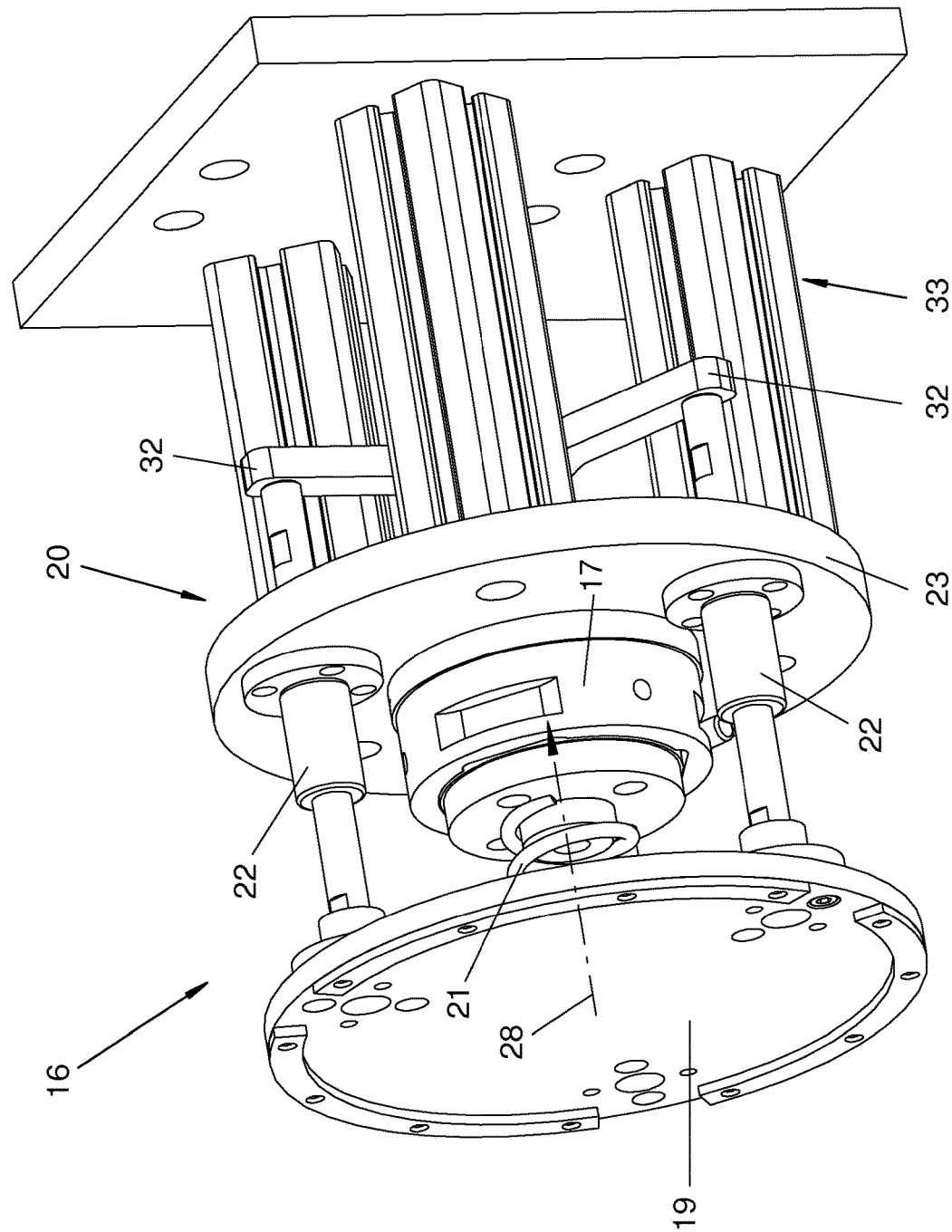
FIG. 6 is a perspective view showing a variant of the measuring device from FIGS. 2 through 5.
Figure 7:
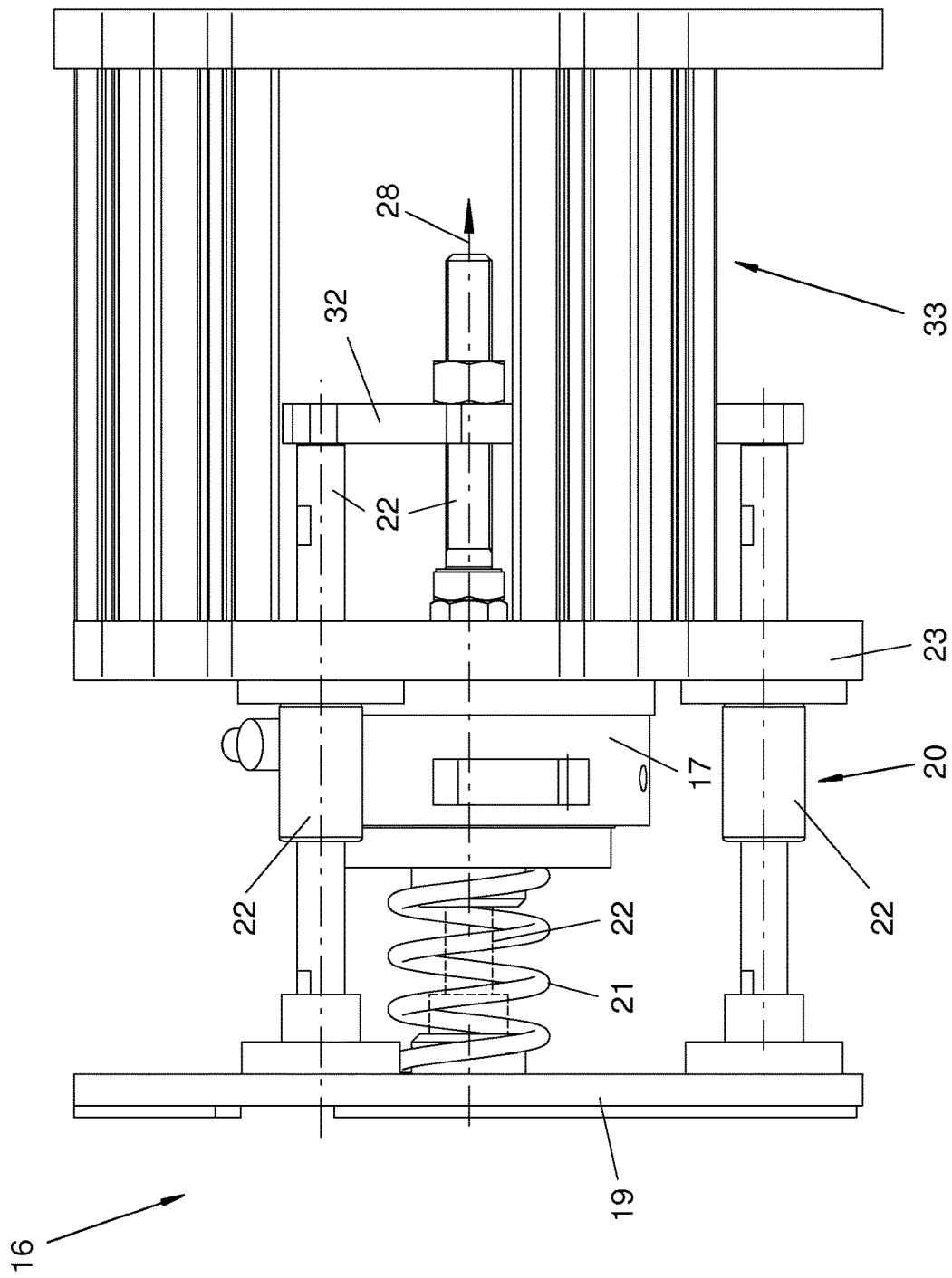
FIG. 7 is a side view showing a variant of the measuring device from FIGS. 2 through 5.

Referring to the drawings, the present invention pertains to a detection device (2) and to a detection method for robot-induced loads, especially forces, which may act upon the human body of a worker (14) in a working process in case of physical contact. The present invention pertains, further, to a working device (1) with an industrial robot (3) and with a detection device (2).

Figure 8:
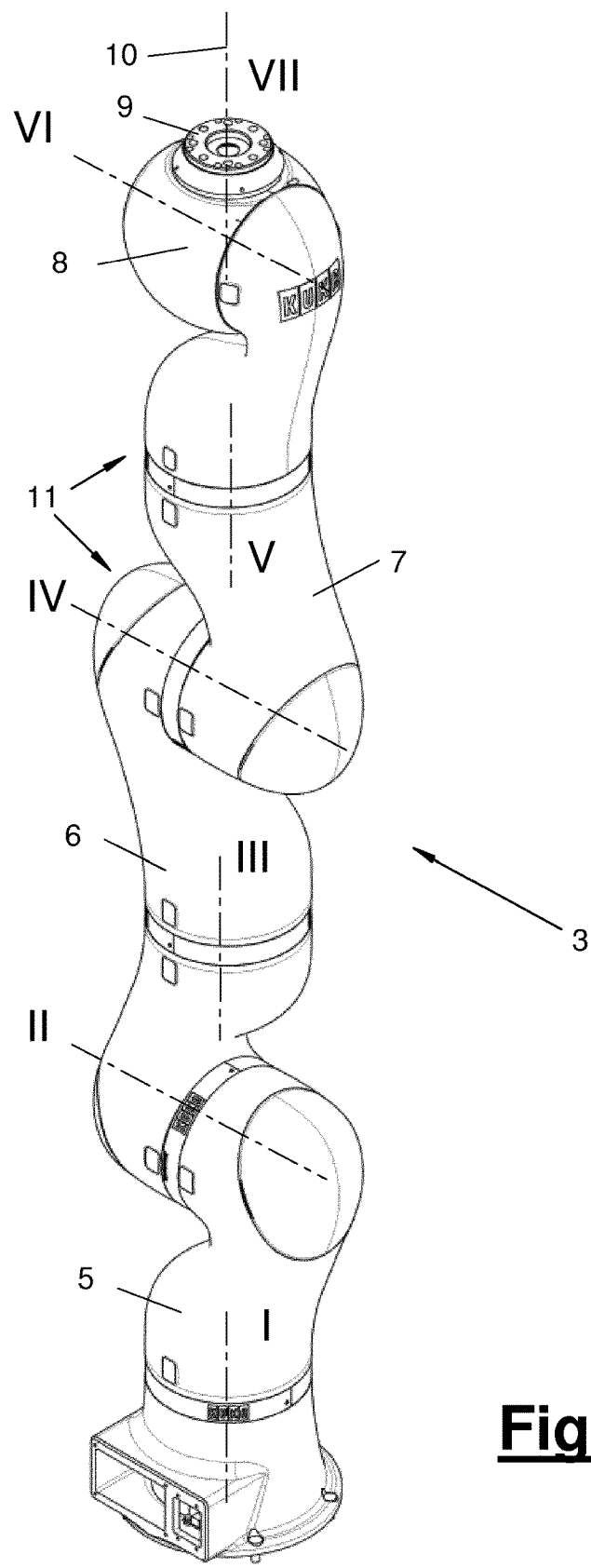
FIG. 8 is a perspective view showing an HRC-suitable tactile robot.

The working device (1) has at least one multiaxial and programmable industrial robot (3), which is preferably configured as a tactile robot and which carries and moves a process tool (4). A preferred embodiment of the industrial robot (3) shown in FIG. 8 will be explained below.

With its tool (4), the industrial robot (3) carries out a process on a workpiece, not shown. The process and the process tool (4) may have any desirable configuration. In the exemplary embodiment being shown, the process is a joining process, especially an assembly process, wherein the process tool (4) is configured as a gripper. Other alternative processes are other joining processes with welding, bonding, soldering or other joining operations, application processes, forming processes or the like. The process tool (4) may have one or more axes of motion and drives of its own.

The working device (1) is configured for a human-robot cooperation or collaboration (HRC for short) with a worker (14), who may enter the work area of the industrial robot (3) with one or more body parts. Physical contacts between the industrial robot (3) or the process tool (4) and the worker (14) are possible in the process, and mechanical loads may develop for a body part in question. These loads, especially the forces occurring, shall be affected, on the one hand, to avoid or limit injuries, and, on the other hand, the performance capacity of the working device (1) and of the industrial robot (3) thereof shall be as high as possible.

The motions of the robot and especially the robot speeds occurring in the process shall be selected to be as high as possible, on the one hand, and, on the other hand, the loads arising herefrom in case of contact with the body of the worker (14) shall be limited to a permissible limit value in connection with the configuration of the working device or industrial robot (3) and of the processes to be performed and of the robot programming. The limit value decisive for the particular body region in question can be obtained from a body model.

Such a contact with the body is simulated with the detection device (2), and the mechanical loads occurring in the process, especially acting forces, are measured, analyzed and compared with the preset limit values. The configuration and programming can be optimized on the basis of the results of the comparison.

The load detection is performed under realistic process conditions, while the industrial robot (3) is moving along its programmed path and comes into physical contact or collides with the detection device (2) at a collision point (13) at its process tool (4) or at another part of the robot. The collision point (13) is located, e.g., according to FIG. 1, at an edge of the process tool (4).

The loads occurring in the process also depend on the shape of the collision point (13), with pointed or sharp-edged contact points (13) causing higher loads and a greater risk of injury than blunt collision points (13). The location at which the collision point (13) is located at the industrial robot (3) or at the process tool (4) and the shape thereof can be detected by means of the robot programming. This may correspondingly affect the limit value comparison.

The detection device (2) is equipped with an analysis unit (29), to which the robot control (12) of the industrial robot (3) may also be connected via a signal connection (18), e.g., an electric signal line. The analysis unit (29) may be a separate analysis unit. As an alternative or in addition, it may be configured as a software module and implemented in an external analysis or control device, especially in the robot control (12).

The analysis unit (29) or the control (12) can perform an analysis of the measured signals and optionally also a comparison with the preset limit values from a body model optionally stored in the analysis unit (29) or in the control (12). The optimization of the motion programming and especially of the programmed robot speeds in the dangerous and collision area on the basis of the limit value comparisons may be carried out manually by a human operator or programmer. It may also be automated with corresponding software.

The detection device (2), which is shown schematically in FIG. 1 and in more detail in two variants in FIGS. 2 through 7, has a measuring device (16) for detecting the robot-induced loads, especially the occurring forces, and a positioning device (15) for correct positioning and orientation of the measuring device (16) for the process in the work area of the industrial robot (3). The measuring device (16) can be positioned and oriented as a result at potential danger and collision points in order to simulate a possible contact with the body of the worker (14) hereby. The positioning and orientation is performed corresponding to the body region possibly present in such an area.

In both variants, the measuring device (16) has a measuring unit (17) as well as a collision element (19) connected thereto movably and such that it is capable of performing a yielding motion for detecting a contact with a collision point (13). The collision element (19) simulates the body surface and can be configured for this in a correspondingly suitable manner. In the exemplary embodiments being shown, the collision element (19) is plate-shaped and is, e.g., in the form of a circular disk.

The ability of the collision element (19) to yield may be given along one or more yield axes (28). A flexibility characteristic of the body part being simulated, especially a spring characteristic and/or a damping characteristic, may also be simulated during such a yielding.

A yielding and guide device (20) is arranged between the collision element (19) and the measuring unit (17) in both variants and is connected to both parts (17, 19). The yielding and guide device (20) has at least one yield axis (28), which is oriented, e.g., at right angles to the surface of the collision element (19). The yielding and guide device (20) preferably has a springy and/or damping characteristic adapted to the body part in question.

There are various possibilities for the design embodiment and the functional embodiment of the yielding and guide device (20). FIGS. 2 through 4 and 6, 7 show two variants for this.

A spring (21), which is supported at both elements (17, 19), is clamped between the collision element (19) and the measuring unit (17) in the exemplary embodiments shown. It is configured, e.g., as a coil spring and is guided with pins at the elements (17, 19).

Further, a guide (22) is present for the collision element (19). This is preferably configured as a straight guide with a plurality of parallel guide sleeves, e.g., in the form of slide bearing bushes, in which cylindrical guide rods slide, which are connected to the collision element (19) at one end and carry a possibly adjustable end stop for limiting the length of extension at the other end. The collision element (19) can be guided along the yield axis (28) such that it is resistant to tilting and rotation.

Two parallel guide sleeves (22) are provided in the embodiment according to FIGS. 2 through 5. The variant according to FIGS. 6 and 7 has three parallel guide sleeves (22), which are arranged in a triangle. The guide rods are connected at the rear end by a three-armed coupling element (32), which ensures stabilization and synchronization and may form an end stop.

The spring (21) has a spring rate that may correspond to the rate of compression of the body part in question or may be approximated to same. The rate of compression may likewise be found in the body model. In the exemplary embodiment being shown, the spring (21) is configured as a compression spring, especially coil spring. It is oriented along the straight guide (22) and the yield axis (28) formed hereby.

The guide (22), especially the straight guide, may have an optionally adjustable damping, which may be formed, e.g., by an adjustable friction element (not shown). A fluidic, especially hydraulic damping is also possible, e.g., with one or more damping cylinders. The damping may correspond to the response of the body part being contacted or be approximated to same and may possibly be taken from the body model.

The measuring unit (17) is configured as a sensor array and is preferably connected to the analysis unit (29) or to the signal connection (18). In the exemplary embodiment being shown, a force sensor is provided, which is arranged on a holder (23) and is supported on the rear side, and said holder may be connected, in turn, to the positioning device (15). The holder (23) is connected, in addition, to the yielding and guide device (20), especially the straight guide (22). The force sensor is configured as a 3D force sensor in the embodiment being shown and is loaded on the upper side by the spring (21).

The holder (23) is arranged at the positioning device (15) such that it is adjustable and can be fixed in the desired position and orientation. In the first embodiment according to FIGS. 2 through 5, the holder (23) is fastened directly on the column (25). In the variant according to FIGS. 6 and 7, a substructure (33) is present, which comprises a mounting bracket fastened to the column (25) and three support columns oriented along the axis (28). These are arranged in the triangle offset in relation to the guides (22) and keep the holder (23) at a distance from the mounting bracket. The coupling element protrudes with its arms into the gaps between the support columns.

The positioning device (15) makes it possible to adjust the measuring device (16) in space along one or preferably more translatory and/or rotatory adjusting axes (30, 31) and has a suitable configuration for this. The positioning device (15) has a frame (24), which is a one-part or multipart frame and may be configured as a rigid or movable frame in itself. Further, one or more adjusting device (27) are provided for defined adjustment and fixation. These may be, e.g., straight or curved grooves with sliding blocks and fixing device or elongated hole guides with clamping bolts or the like.

In the exemplary embodiment being shown, the frame (24) has a base (26) for mounting on a workbench or another support in the work area of the industrial robot (3). An upright column (25) is arranged on the base (26). The measuring unit (17) is mounted on the column (25) vertically adjustably, e.g., via the holder (23) along the adjusting axis (30) and can be fixed in the desired position.

The column (25) may be connected to the base (26) rigidly or movably. The column (25) is arranged rigidly or movably, e.g., on a one-part or multipart bearing plate. A rotatory adjusting axis (31) can be formed with suitable adjusting device (27) by means of a movable connection, e.g., between the column (25) and the bearing plate. As an alternative or in addition, one or more translatory adjusting axes may be present between the column (25) and the base (26). On the other hand, it is possible to form another yield axis between two movable frame parts, especially between the column (25) and the base (26).

The HRC suitability of the working device (1) and optionally of the industrial robot (3) may be established in different ways. In the exemplary embodiments, the industrial robot (3) is configured as a tactile robot and is HRC suitable itself.

The industrial robot is preferably a tactile multiaxial industrial robot (3) with a preferably integrated sensor system (11), which possesses sensory properties and can detect itself a physical contact with the human body or other obstacles and respond to same. It can, e.g., stop or possibly also move away, especially move back, from the contact point. The tactile industrial robot (3) detects a physical contact as an external load, which occurs at a position of the robot at which this load is not expected. There may be different load and response thresholds for the response to a physical contact. The tactile industrial robot (3) may cooperate with the worker (14) in an open work area without fence or other machine boundary. Pain-free contacts may also occur in the process.

The industrial robot (3) may be configured, e.g., according to DE 10 2007 063 099 A1, DE 10 2007 014 023 A1 and/or DE 10 2007 028 758 B4. A preferred embodiment according to FIG. 8 will be explained below.

The industrial robot (3) is connected to an external or integrated robot control (12). The tactile industrial robot (3) may have the preferably integrated sensor system (11) indicated in FIG. 8 for detecting forces and/or torques acting from the outside, which sensor system is connected to the robot control (12) and is used to control or regulate the motions of the robot, especially to regulate the flexibility. The tactile industrial robot may have especially force- or torque-regulated axes.

The industrial robot (3) has a plurality of, e.g., four movable and interconnected links (5, 6, 7, 8). The links (5, 6, 7, 8) are connected to one another and to a base preferably in an articulated manner and via rotating robot axes I-VII. The base may have a connection shown in FIG. 8. It is, further, possible that individual links (6, 7) are configured as multipart links and movable in themselves, especially rotatable about the longitudinal axis.

In the exemplary embodiment being shown, the industrial robot (3) is configured as an articulated arm or bent-arm robot and has seven driven axes or axes of motion I-VII. The axes I-VII are connected to the robot control and can be controlled and possibly regulated. The output-side end link (8) of the robot (3) is configured, e.g., as a robot hand and has the driven element (9) rotatable about an axis of rotation (10), e.g., a driven flange. The axis of rotation (10) forms the last robot axis VII. One or more lines for operating materials, e.g., power and signal currents, fluids, etc., may be led through a possibly hollow driven element (9) and possibly other robot links (5, 6, 7) and exit to the outside at the flange.

The robot (3) has preferably three or more movable links (5, 6, 7, 8). In the exemplary embodiment being shown, it has a basic link (5) connected to the substructure via a base and the aforementioned end link (8) as well as two intermediate links (6, 7). The intermediate links (6, 7) are configured as multipart links rotatable in themselves by means of axes (III) and (V). As an alternative, the number of intermediate links (6, 7) may be lower or higher. In another variant, individual intermediate links (6, 7) or all intermediate links (6, 7) may be configured as links that are nonrotatable in themselves and without an additional axis. The links (5, 6, 7, 8) may have a straight shape or a shape bent according to FIG. 8. The industrial robot (3) may be arranged according to FIG. 1 as an upright robot or, as an alternative, as a suspended robot.

The robot axes I-VII have an axis bearing each, e.g., a pivot bearing or a hinge, and an integrated, controllable, optionally regulatable axis drive, e.g., a rotary drive, which is associated here. In addition, the robot axes I-VII may have a controllable or switchable brake and the optionally redundant sensor system (11). The sensor system may be integrated and may have, e.g., one or more sensors at one or more robot axes I-VII. These sensors may have identical or different functions. In particular, they may be configured for detecting active loads, especially torques. They may, furthermore, detect rotary motions and possibly rotation positions. In another embodiment, such a sensor system connected to the robot control may be attached to the industrial robot (3) externally, e.g., on the driven element (8) or on the process tool (4).

The aforementioned force control or force regulation of the robot axes (I-VII) pertains to the action to the outside at the driven element (9) of the end link (8) as well as to the forces of reaction acting there. Torque control or torque regulation takes place internally within the robot at the rotating axes or axis drives.

The industrial robot (3) may have one or more flexible axes (I-VII) or flexible axis drives with a flexibility regulation for the HRC suitability. The flexibility regulation may be a simple force regulation or a combination of a position regulation and a force regulation. Such a flexible axis avoids accidents with persons and crashes with objects or a springy yielding in case of unforeseen collisions. On the other hand, it can be advantageously be used for the working process in different respects. On the one hand, the ability of the industrial robot (3) to yield elastically can be used for manual teaching and programming. In addition, the seeking and finding of the working position of the process tool (4) at the workpiece can be supported and facilitated by means of the load detection with the robot's sensor system at the axes (I-VII). Angle errors in the relative position of the links (5, 6, 7, 8) can also be detected and corrected as needed. One or more flexible axes are, furthermore, advantageous for tracking the process tool (4) corresponding to the feed. The industrial robot (3) can, moreover, apply a defined pressing force or tensile force as needed. Weight compensation may also take place in the different cases.

The industrial robot (3) being shown may be configured as a lightweight robot and consist of lightweight materials, e.g., light metals and plastic. It also has a small overall size. The process tool (4), whose construction and function are simplified, likewise has a low weight. The industrial robot (3) with its process tool (4) is, on the whole, a lightweight robot as a result and can be transferred from one site of use to another. The weight of the industrial robot (3) and the process tool (4) may be less than 50 kg, especially about 30 kg. Due to the possibility of manual teaching, the industrial robot (3) can be programmed, put into operation and adapted to different processes rapidly and in a simple manner.

The industrial robot (3) is programmable, the robot control (12) having a computer, one or more memories for data or programs as well as input and output units. The process tool (4) may be connected to the robot control (12) or to another, shared control and implemented, e.g., as a controlled axis in the robot control. The robot control may store process-relevant data, e.g., sensor data, and log them for quality control and quality assurance.

The sensor system (11) may likewise be connected to the analysis unit (29) of the detection device (2). Synchronous analysis and comparison of the signals of the robot's internal collision detection or sensor system (11) and of the measured values of the external detection device (2) represent important elements of the detection technique. It can be determined in this connection whether the sensor system (11) of the HRC-suitable industrial robot (3) and the detection device (2) measure comparable forces in case of a collision. The time characteristics, e.g., concerning the rapidity of response, force curve, etc., can be checked now as well. A configuration of the analysis unit (29) as a software module in the robot control (12) is especially suitable for this.

The detection device (2) may be used, on the one hand, to validate and prove an HRC suitability of the industrial robot (3) and of the workstation (1). In particular, compliance with the force and load limit values can be demonstrated in this connection. The detection device (2) may be a mobile device for this purpose and installed and positioned for measurements in an appropriate manner for the particular situation at different relevant sites in the work area of the industrial robot (3). The measured values of the detection device (2) can be analyzed and stored with location reference in the analysis unit (29) and the validation results can be logged and outputted.

The detection device (2) may be used, furthermore, to calibrate the HRC-suitable industrial robot (3) and especially the sensor system (11) thereof. The calibration may pertain, in particular, to the association of robot speeds with force or load limit values for the body.

Different variants of the embodiments shown and described are possible. On the one hand, the features of the exemplary embodiments and of variants thereof may be combined with one another and also transposed as desired.

The yielding and guide device (20) may have a different configuration and different kinematics. The yield axis (28) may optionally be bent. The guide (22) may be configured as scissors or in another manner. As an alternative, a compressible body may be used as a spring (21).

The industrial robot (3) may optionally have one or more positioned-controlled robot axes without force control or regulation. As an alternative or in addition to the preferred sensor system (11) integrated in one or more links (5, 6, 7, 8), a sensor system arranged externally at the robot (3) or at the process tool (4) may be used. This sensor system may have sensors detecting objects in the work area of the robot in a contactless manner. These may be, for example, capacitive or inductive sensors. The HRC suitability may be achieved by another configuration of the robot, e.g., with the aforementioned external sensor system, with an optical work area monitoring or in another manner.

The industrial robot (3) may have, further, a different number and configuration of links and robot axes. It may have any desired number and combination of rotatory and/or translatory robot axes with corresponding axis drives.

While specific embodiments of the invention have been shown and described in detail to illustrate the application of the principles of the invention, it will be understood that the invention may be embodied otherwise without departing from such principles.

The invention claimed is:

1. A detection device for robot-induced loads, which may act on a human body in a working process in case of physical contact of an industrial robot with the human body in a robot work area and which industrial robot includes an internal industrial robot sensor system detecting forces of the industrial robot internally of the industrial robot, the detection device comprising:
   a measuring device for an external detection of robot-induced forces;
   an analysis unit for synchronously analyzing and comparing the forces detected externally by the measuring device with the forces detected by the internal sensor system of the industrial robot in case of a physical contact with the industrial robot; and
   a positioning device for correctly positioning and orienting the measuring device for the working process in the work area of an industrial robot.

2. A detection device in accordance with claim 1, wherein the measuring device comprises a measuring unit comprising a sensor and a collision element, which is connected to the measuring device movably and such that the collision element is able to yield elastically, for the contact with a collision point at an industrial robot.

3. A detection device in accordance with claim 2, further comprising a yielding and guide device with at least one yield axis arranged between the collision element and the measuring unit whereby the yielding and guide device has a spring characteristic or a damping characteristic or both a spring characteristic and a damping characteristic adapted to a human body part, of the human, in the robot work area.

4. A detection device in accordance with claim 3, wherein the spring of the yielding and guide device is clamped between the collision element and the measuring unit and a straight guide, for the collision element.

5. A working device comprising:
   an industrial robot, which carries a process tool and which is configured as an HRC robot suitable for human-robot cooperation or collaboration, the industrial robot comprising an internal industrial robot sensor system detecting forces of the robot internally of the industrial robot; and
   a detection device, which detects robot-induced loads, which may act on the human body in the working process in case of physical contact with the industrial robot or with the process tool or with both the industrial robot and the process tool, is arranged in a robot work area of the industrial robot, the detection device comprising:
   a measuring device for an external detection of robot-induced forces;
   an analysis unit for synchronously analyzing and comparing the forces detected externally by the measuring device with the forces detected by the internal sensor system of the industrial robot in case of a physical contact with the industrial robot; and
   a positioning device for correctly positioning and orienting the measuring device for the working process in the work area of an industrial robot.

6. A working device in accordance with claim 5, wherein the industrial robot is configured as a tactile and multiaxial industrial robot with a plurality of links.

7. A working device in accordance with claim 5, wherein the industrial robot has at least one flexible robot axis (I-VII) with a flexibility regulation comprising a simple force regulation or a combination of position regulation and force regulation.

8. A working device in accordance with claim 5, wherein the internal industrial robot sensor system of the industrial robot comprises an integrated sensor system with one or more force or torque sensors, at one or more robot axes.

9. A working device in accordance with claim 8, wherein the detection device is configured as a calibrating device for the industrial robot and the associated integrated sensor system.

10. A method for detecting robot-induced loads, which may act on the human body in a working process in case of physical contact with an industrial robot and which industrial robot includes an internal industrial robot sensor system detecting forces of the robot internally, the method comprising the steps of:
    measuring the robot-induced forces with a measuring device of an external detection device, wherein the measuring device is positioned and oriented correctly for the process in a work area of an industrial robot by means of a positioning device; and
    synchronously analyzing and comparing the forces detected externally by the measuring device with the forces detected by the internal sensor system of the industrial robot in case of a contact.

11. A method in accordance with claim 10, wherein the load detection takes place under realistic conditions, while the industrial robot is moving along a programmed path and comes into physical contact or collides with a collision point at a process tool thereof or at another robot part with the detection device.

12. A method in accordance with claim 10, wherein the internal industrial robot sensor system of the industrial robot is calibrated by means of the external detection of the robot-induced loads.

13. A method in accordance with claim 10, wherein a body surface is simulated with a collision element of the measuring device, said collision element being connected to a measuring unit of the measuring device movably and such that said collision element is able to yield elastically.

14. A method in accordance with claim 10, wherein the HRC suitability of the industrial robot and of the working device is validated and proven by means of the detection of the robot-induced loads.

15. A method in accordance with claim 10, wherein a working device, the industrial robot and the process to be performed are configured by means of the detection of the robot-induced loads.

16. A method in accordance with claim 10, wherein when configuring a working device, the industrial robot and the process to be carried out, a limit value that is decisive for a particular body region affected is taken from a body model.

17. A method in accordance with claim 10, wherein the location of a collision point at the industrial robot or at the process tool and the shape of said collision point are detected by programming the robot.

* * * * *